May 17, 1938.  D. I. OUSHEFF  2,117,990
SOLVENT THINNER AND METHOD FOR PREPARING THE SAME
Filed Dec. 3, 1937
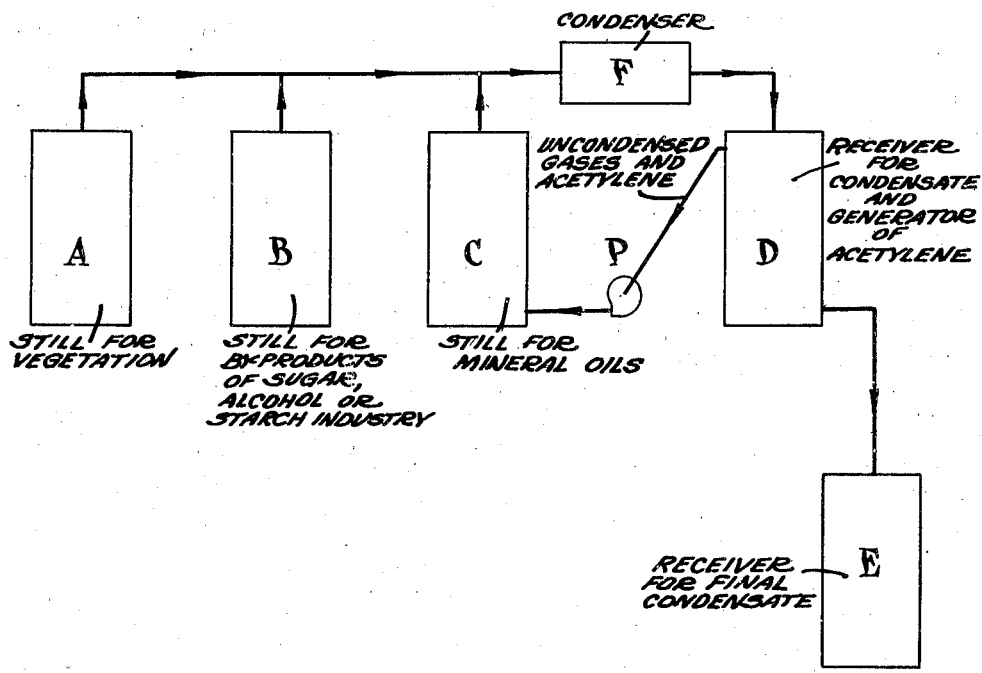

Patented May 17, 1938

2,117,990

UNITED STATES PATENT OFFICE 2,117,990

SOLVENT THINNER AND METHOD FOR PREPARING THE SAME

Dimiter Ivanoff Ousheff, Buffalo, N. Y.

Application December 3, 1937, Serial No. 177,860

6 Claims. (Cl. 134—56)

This invention relates to a solvent thinner, particularly for use in paints and cellulose derivative lacquers for metals, woods and other materials and to the method of making the same.

The drawing shows a diagrammatic representation of an apparatus which is useful in the practice of this invention.

As raw materials I use a mixture of the following: (1) distillation products from the dry distillation of vegetable matter; (2) distillation products from by-products formed in the manufacture of starch, alcohol and sugar; (3) distillation products of mineral oils.

The first component of this mixture, consisting of the distillation products from vegetable matter, can be derived from wood such as the trunks and branches of pine and other trees, or the leaves and needles of various kinds of trees, or other vegetable matter such as straw and the stems of plants. Distillation of this material is accomplished in any ordinary distilling apparatus A heated by direct flame or superheated steam. Preferably it operates at low pressure such as 10 or 12 cm. of mercury. After working at low pressure for a considerable period of time, such as 6 hours, it may then be operated at normal pressure as the temperature gradually rises from 400° to 500° C.

The principal ingredients of the second component are fusel oil from the manufacture of alcohol and molasses from the manufacture of sugar. Distillation of this material is also accomplished in any ordinary distilling apparatus B heated by direct flame or superheated steam. Preferably it operates at low pressure such as 10 or 12 cm. of mercury. After working at low pressure for a considerable period of time it may then be operated at normal pressure as the temperature gradually rises from 400° to 500° C.

As the third component, heavy mineral oils or by-products from the distillation of petroleum such as mazut or gasoline or preferably used. This distillation is preferably carried out in a suitable distilling apparatus C at a pressure of 10 to 15 atmospheres and a temperature of 400° to 500° C. in the absence of air.

The distillation products from these three distillation processes are then simultaneously reacted with acetylene. This is preferably effected by leading the distillation products through a condenser F into a common receiver or reaction vessel D where acetylene is being formed. The acetylene is formed in ordinary fashion from the reaction of water and calcium carbide to form calcium oxide and acetylene. Distillation products which fail to condense and react with the acetylene are preferably withdrawn from the reaction vessel D by a pump P and returned to distillation apparatus C.

At the same time the reaction proceeding in the receiver is aided by the addition of concentrated sulphuric or hydrochloric acid until an acid reaction is obtained.

The reaction products thus formed are then transferred to a second receiver where the mixture is de-hydrated by the addition of sulphuric acid, preferably in the proportion of one part of 66 Bé. sulphuric acid to four parts of reaction mixture. The solution is then neutralized by means of calcium oxide until an alkaline reaction is obtained. The resulting mixture is distilled at a pressure of 10 to 12 cm. of mercury. Any water remaining in the product is separated by means of decantation.

The relative proportions of the three components can be any convenient quantity according to the results required. In practice the distillation products from ten parts of vegetable matter, such as wood, the distillation products from four to five parts of the by-products from the manufacture of alcohol, starch and sugar, and the distillation products of heavy mineral oil are reacted with acetylene resulting from the reaction of calcium carbide with water.

It is believed that the distillation products resulting from the various distillation processes consists principally of ethers, esters, olefines and paraffins and that these products or some members of them act as catalysts in the polymerization of acetylene to benzene which in turn immediately reacts with said ethers, esters, olefines and paraffines to form various aromatic ethers, esters, etc. However, it is to be understood that this invention is not to be limited by this theory but that any product resulting from the above process is intended to be covered.

Having described my invention as above, I claim:

1. A method of producing a solvent thinner consisting of a mixture of liquid organic oxygenated and hydrocarbon compounds comprising a product formed by destructively distilling waste vegetative substance and by-products thereof such as molasses, fusel oil and other by-products of the alcohol and sugar industries, and separately distilling mineral oils or mineral oil distillates under temperatures and pressures high enough to distill, decompose and react with acetylene gas and uncondensable gases of the system, blending such vapors under the high temperature and pressures of the reaction system, condensing the vapors, passing the condensate containing water in contact with calcium carbide to form acetylene gases, separating the acetylene gases and uncondensable gases formed in the system and passing the same into the hot mineral oil distillation system for reaction therewith or with the distillates of the other products, fractionally distilling the liquids, separated from the system, to obtain a solvent fraction boiling in the range from 45° to 170° C.

2. Method according to claim 1, wherein the liquid condensate of the system is neutralized with acid to decompose the lime and lime salts.

3. Method according to claim 1 wherein the liquids separated are first neutralized with acid, further acidified with concentrated mineral acid, again rendered alkaline before being distilled.

4. Method according to claim 1 wherein the temperature of reaction of the mineral oil and acetylene and noncondensable gases is of the order of 400° to 500° C. and the pressure about 10 to 15 atmospheres.

5. Method according to claim 1 wherein the distillation of the vegetable substance is initially under a vacuum and the pressure is gradually increased to atmospheric after the system is operating.

6. Solvent thinner formed by destructively distilling waste vegetable substance and by-products thereof such as molasses, fusel oil and other by-products of the alcohol and sugar industries and mixtures thereof, separately distilling mineral oils or mineral oil distillates under temperatures and pressures high enough to distill, decompose and react with acetylene gas and uncondensable gases in the system, blending distillates, vapors, and gases produced by both distillations under the high temperatures and pressures of the reaction system, condensing all vapors formed, passing the liquid condensate containing some water in contact with calcium carbide to form acetylene gas, passing the acetylene gas with any uncondensable gases formed in the system into the hot mineral oil distillation system for reaction therewith or with the distillates of the other products, separating the liquids condensed from the gases, treating with concentrated mineral acid, then neutralizing with alkali and finally fractionally distillating to obtain a fraction boiling in the range of 45° to 170° C.

DIMITER IVANOFF OUSHEFF.